F. J. KLIEWER.
HARROW ATTACHMENT FOR PLOWS.
APPLICATION FILED JUNE 4, 1912.
1,102,058.
Patented June 30, 1914.
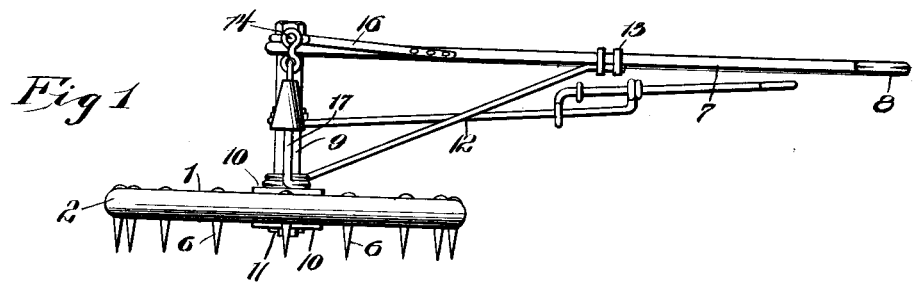
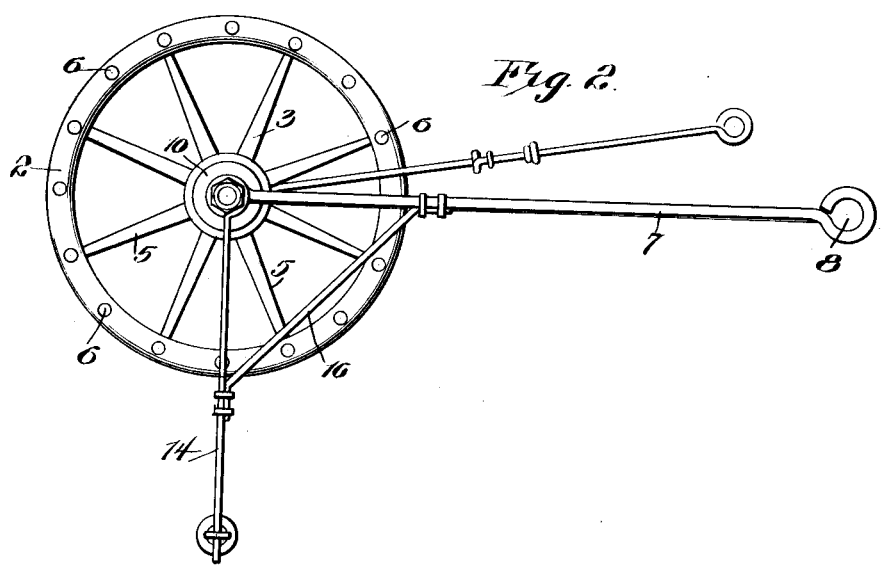
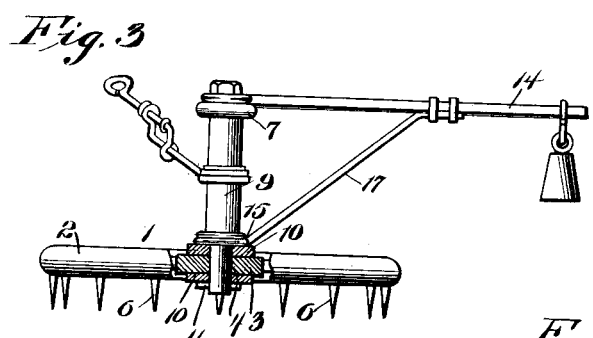
Witnesses
Wm H. Mulligan
J. A. Garner
Inventor
Frank J. Kliewer.
By Victor J. Evans,
Attorney

UNITED STATES PATENT OFFICE.

FRANK J. KLIEWER, OF NEWTON, KANSAS.

HARROW ATTACHMENT FOR PLOWS.

1,102,058. Specification of Letters Patent. Patented June 30, 1914.

Application filed June 4, 1912. Serial No. 701,591.

*To all whom it may concern:*

Be it known that I, FRANK J. KLIEWER, a citizen of the United States, residing at Newton, in the county of Harvey and State of Kansas, have invented new and useful Improvements in Harrow Attachments for Plows, of which the following is a specification.

This invention is an improved harrow which is adapted to be attached to and used in connection with a plow so that land may be plowed and harrowed simultaneously and thereby quickly prepared for planting, the invention consisting in the construction, combination and arrangement of devices, hereinafter described and claimed.

In the accompanying drawing:—Figure 1 is an elevation of a harrow attachment constructed in accordance with my invention. Fig. 2 is a plan of the same. Fig. 3 is a rear elevation of the same.

In accordance with my invention, I provide a circular rotary harrow element 1. In the form of my invention here shown, the harrow element comprises a tubular rim 2, which, in practice, may be made of a bent pipe of suitable length and diameter. I also provide a centrally disposed circular plate 3, which forms the hub or center of the rotary harrow element and is provided with a central boxing 4. The radial arms or spokes 5 of the rotary harrow element are preferably iron bars which have their inner ends bolted to the under side of the plate 3 and their outer ends bent around and secured to the tubular rim 2. The said tubular rim is provided with openings for the reception of harrow teeth 6. I also provide a beam 7 which may be made of any suitable material and is preferably made of pipe, iron or steel. At the front end of the said beam is a draft ring 8 whereby the harrow attachment may be connected to a plow. At the rear end of the beam is a standard 9, the lower end of which forms a spindle on which the harrow element is mounted to revolve, the spindle or lower end of the standard being provided with a pair of spaced washers or annular shoulders 10 which bear on the upper and lower sides of the plate 3 and together with the rotary harrow element are held in place by a pin or other suitable device 11. The lower end of the standard portion of the beam is connected, by a forwardly extending inclined brace rod 12 to the beam 7 at a point a suitable distance from the front end of the latter, by means of a suitable clip or other device 13.

A weight arm 14, to carry a suitable weight at one side of the harrow attachment is arranged transversely of the device, with its inner end connected to the upper end of the standard 9. This weight arm is held in place and supported by a pair of brace rods 16—17 which are respectively connected to the beam and to the standard. It will be understood that my improved harrow attachment operates on the plowed land at one side of the plow and by the rotation of the toothed harrow element, serves to effectually harrow the soil at the same time that it is plowed. A spacing member 18 is also provided which has one end attached to the standard of the harrow at a point intermediate the ends of said standard and is adapted to be attached at the other end to one of the handles of any other suitable point on the plow in connection with which the harrow is used.

While I have herein shown and described a preferred form of my invention, I would have it understood that changes may be made in the form, proportion and construction of the several parts without departing from the spirit of my invention and within the scope of the appended claim.

I claim:—

The herein described harrow attachment for plows comprising a rotary harrow element a beam having a standard on the lower end of which the harrow element is on for rotation a transversely extending weight arm having its inner end connected to the upper end of the standard, a brace rod connecting the lower end of the standard to the beam at a point near the front end of the latter, a flexible rod connecting the weight arm to the lower end of the standard, a brace rod lying in the angle between the weight arm and beam and connecting them, and a spacer element having one end connected to the standard at a point intermediate the ends of the standard.

In testimony whereof I affix my signature in presence of two witnesses.

FRANK J. KLIEWER.

Witnesses:
G. B. RIDDLE,
C. E. EWING.

Copies of this patent may be obtained for five cents each, by addressing the "Commissioner of Patents, Washington, D. C."